Figure 1:
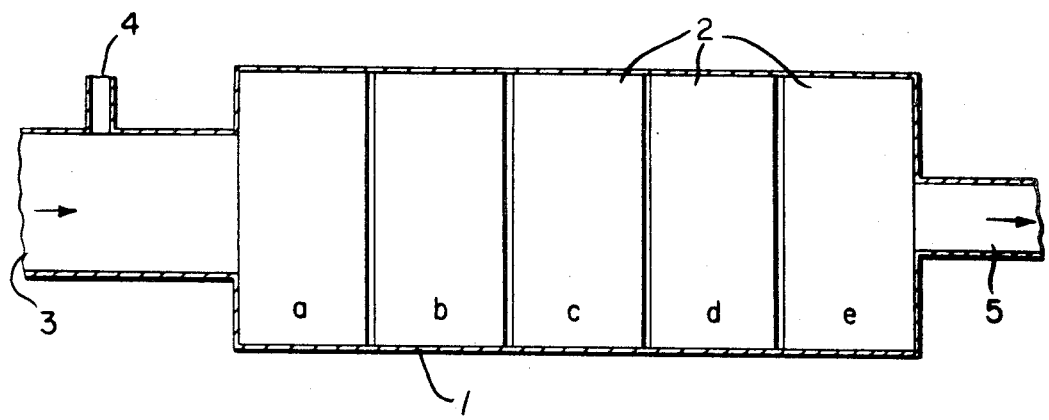

Aug. 13, 1968   H. TALSMA   3,397,154
PREPARATION OF ALUMINA-SUPPORTED CATALYST COMPOSITIONS
AND THE PRODUCTS THEREOF
Filed July 9, 1963

INVENTOR
HERBERT TALSMA
BY *Sol Schwartz*
ATTORNEY

United States Patent Office 3,397,154
Patented Aug. 13, 1968

3,397,154
PREPARATION OF ALUMINA-SUPPORTED CATALYST COMPOSITIONS AND THE PRODUCTS THEREOF
Herbert Talsma, Westchester, Pa., assignor to E. I. du Pont de Nemours and Company, Wilmington, Del., a corporation of Delaware
Continuation-in-part of application Ser. No. 222,238, Sept. 7, 1962. This application July 9, 1963, Ser. No. 293,618
10 Claims. (Cl. 252—463)

This application is a continuation-in-part of U.S. applications Ser. No. 82,053, filed Jan. 11, 1961, now abandoned, Ser. No. 133,977, filed Aug. 25, 1961, now abandoned, Ser. No. 162,320, filed Dec. 20, 1961, now abandoned, and Ser. No. 222,238, filed Sept. 7, 1962, now U.S. Patent 3,255,027.

This invention relates to novel catalyst supports and structures, methods for preparing and using the same.

A wide variety of catalysts are now in commercial use in which an alumina base is impregnated with an activating metal or metal oxide. A common deficiency of such catalysts is their greatly decreased activity at the more elevated temperatures. This is due in part to an unstable physical structure which tends to sinter at high temperatures and thus reduces the available surface area. In new areas of investigation as in automobile exhaust abatement, the available catalyst supports are also deficient in strength so that continued vibration in use tends to comminute the particles to fines and hence reduce the efficiency of the catalyst bed. The available catalysts have the further disadvantage that they must be used in the form of a loose bed and thus greatly restrict the design of catalytic chambers.

One object of this invention is to provide a catalytic structure that has improved retention of the catalyst activity at elevated temperatures as compared to the prior art structures, and a process for making the same.

Another object is to provide a catalytically active refractory structure bonded to metal members of an apparatus.

Another object of this invention is to provide an improved process for the oxidation of combustion engine exhausts.

One object of this invention has been attained by a catalytic structure comprising a catalytically active metal component (preferably at least 0.01% by weight) deposited on a porous refractory body comprising a skeletal structure of crystalline interconnected walls which define cells with an average diameter of 0.5 to 200 mils, said walls being dense and having a thickness of between 0.3 and 200 mils and containing at least 30% by weight of $Al_2O_3$. The wall material may be alpha-alumina or it can be constituted by compounds and solid solutions of alumina and at least one other oxide or solid solutions of at least one oxide in the said compounds of alumina.

Preferably the refractory body contains at least 1% of aluminum in a state of oxidation below a valence of 3 and at least 80% (by analysis) of $Al_2O_3$. Still more preferably the refractory is characterized by a "perfection factor" (more particularly defined below) greater than one. It will be understood that in the event the refractory body is crushed to provide a particulate catalyst base, that the wall material will no longer be present as a skeletal structure. However, the wall thickness and the chemical and physical constitution of the crystalline wall material is still discernible.

The catalytically active metal component is selected from the group consisting of (a) Oxides of iron, cobalt, nickel, vanadium, chromium, manganese, copper, zinc, molybdenum, silver, tin, barium, cerium, tungsten, lead and bismuth,
(b) Mixed oxides of (a),
(c) Elemental metals of ruthenium, platinum, palladium, rhodium, osmium and iridium.

Mixtures and precursors of the foregoing catalysts are also intended.

The catalytic structures are employed in accordance with a further embodiment of the invention in an oxidation process. Thus, hydrocarbons and partially oxidized hydrocarbon products may be passed in vapor form, in contact with a catalytic structure of the invention. The latter structure is prepared by heating aluminum particles and at least 0.02% by weight of the aluminum of a metal oxide fluxing agent, in the presence of oxygen and at a temperature between 400 and 1500° C., until at least 10% (preferably 90%) has been oxidized and at least 1% of the aluminum is present in a state of oxidation below a valence of 3, and depositing thereon the aforementioned catalytically active metal component.

The preparation of the catalyst support itself may be carried out in two general ways. In the preferred method aluminum particles are oxidized in situ, in a porous body having a porosity of at least 20% so that an alumina-containing skeletal structure is produced. This process is described in detail in parent case Ser. No. 222,238, now U.S. Patent 3,255,027. The unfired body can contain from zero to 8 parts of a particulate filler refractory per part of aluminum. In order to gain the greatest amount of catalytic activity the unfired body should contain less than 33% of the filler refractory.

The catalyst support can also be prepared by oxidizing aluminum particles so separated from one another that discrete particles are produced rather than the unitary skeletal structure. The aluminum particles for example can be conveniently kept apart during oxidation by mixing them with a powdered refractory which does not react with aluminum or alumina to give an alumina-containing compound under the firing conditions. The porous mixture is then fired as above. The discrete particles of alumina may be separated in any convenient manner as by screening.

The surprising catalytic activity of the alumina structure of this invention and the synergistic results obtained with such structures when impregnated with conventional catalysts is believed to be due to the incomplete in situ oxidation of aluminum in their preparation. The structures of this invention (before impregation) are characterized by a black to dark gray color as contrasted to the pure white of alumina itself. This color may be masked by the presence of other elements (chromium for example) but it is always darker than a completely fired sample of the same composition. It is postulated that the color is due to suboxides of alumina and possibly finely dispersed metallic aluminum.

In the preparation of the catalyst supports of the invention, aluminum particles and particles of alloys of aluminum with other metals in which aluminum constitutes the major component may be used. The metal used is preferably clean and free from grease and oil. The aluminum particles should have one dimension of at least about 7 mils (preferably 10 mils), a second dimension of at least 0.5 mil and a third minor dimension, i.e., between about 0.5 mil and 200 mils. For example, if spheres of aluminum are used, they must have a diameter between 7 and 200 mils (between about 3.5 and 80 mesh). Cylindrical rods as fibers must have a diameter of between 0.5 and 200 mils and a length of at least 7 mils. The length is not critical and can vary from short staple to continuous filaments. The aluminum particles can be organized into ordered structures such as a honeycomb, woven screen, etc.

Suitable fluxing agents for use in forming the catalyst supports include an oxide of a metal from the class consisting of the alkali metals, the alkaline earth metals, vanadium, chromium, molybdenum, tungsten, copper, silver, zinc, antimony, and bismuth, precursors of these oxides and hydroxides of the alkali metals. The oxides and hydroxides of the alkali metals, magnesium, strontium and barium are preferred.

Among suitable precursors of these materials may be mentioned the organic salts such as acetates, benzoates, etc., and inorganic salts as bisulfates, bisulfites, bromates, nitrates, silicates, sulfates, sulfites, thiosulfates, etc., of the recited metals. While not "per se" within the class of useful fluxing agents, these compounds do, under conditions of the reaction, yield compounds within the above defined class. In addition, trialkyl tin oxide and lead silicate ($PbSiO_3$) are also useful as fluxing agents.

In addition to aluminum and a fluxing agent, the green (unfired) structures of the present invention may contain up to about 48% of a filler refractory. Generally these may be any of the carbides of aluminum, boron, hafnium, niobium, silicon, tantalum, thorium, titanium, tungsten, vanadium, and zirconium; the nitrides of aluminum, boron, hafnium, niobiom, tantalum, thorium, titanium, uranium, vanadium, and zirconium; the borides of chromium, hafnium, molybdenum, niobium, tantalum, titanium, tungsten, vanadium and zirconium; or the oxides of aluminum, beryllium, cerium, hafnium, lanthanum, magnesium, uranium, yttrium, the stabilized oxide of zirconium and less preferably silicon dioxide. Precursors and mixtures of and compounds containing the aforementioned refractory compounds can also be used. These compounds may reside in the catalyst support as such or may react to form spinels, mullite, etc., or go into solid solution.

For some applications, especially in forming alumina-containing lining or coatings on steel, etc., siliceous compounds are used as the filler refractory. The siliceous compounds include all manner of substances which contain silica or silicic acid based on chemical analyses. Various clays such as kaolin, ball clay, and the many fire clays are satisfactory. Burnt clays (i.e., grog) may be used. Minerals containing magnesium and silicon, such as asbestos, talc, steatite, soapstone, fosterite, and vermiculite are satisfactory.

Certain clays may contain sufficient alkali metal oxides to serve as a flux. However, it has been found that about 3.0% (based on clay) of an alkali metal oxide must be present in (or added to) a clay to be effective as a flux at temperatures of about 1000° C.

The minimum amount of aluminum which may be used to form skeletal structures in the catalyst support is in part dependent upon the size distribution of metal particles and on the nature of the filler refractory. For example, where MgO or other reactive oxide is present, and aluminum particles of about 15 mil average diameter are employed, the minimum aluminum content can be about 11% where reaction temperatures to form a compound with alumina (e.g., spinel) are attained. On the other hand, with alumina, silicon carbide or other non-reactive filler refractory, at least about 20% of aluminum particles of the same size must be employed. In both cases, greater amounts of aluminum, e.g., 14 and 24% respectively are required where larger particles, i.e., about 50 mil diameter, are used.

Prior to heating the shaped metal aggregate particles in an oxidizing atmosphere, the surfaces of the aggregate particles are intimately contacted with a fluxing agent. The agent may be applied dry, in solution, as a gas or as a melt. The manpulative technique of contacting the metal surface with it is not critical. Thus it may be powdered or sprayed upon the metal, or the metal may be dipped in a solution of the agent or its melt or powder. It is conveniently done using a concentrated aqueous solution or slurry. The use of pressure and/or vacuum to assist in uniform and complete distribution of the agent over the particle surfaces is often advantageous. Furthermore, when using dilute solutions, the addition of a thickener such as sodium carboxymethyl cellulose may be advantageous. The fluxing agent may be mixed with the filler refractory and the metal shapes added to the mixture. The filler refractory may also serve as a flux (e.g., MgO) and vice versa. In some instances as with certain minerals, the filler refractory may also contain the fluxing agent.

In some cases it is advantageous to add minor amounts of water, ethyl alcohol, ethylene glycol, acetone, solutions of carboxymethyl cellulose, rubber, gum arabic, polyvinyl alcohol, natural gums, glue and the like to increase the green strength of the shaped object. A self-bonding additive such as Sorel cement can also be used for this purpose. Preferably a material is used that will burn out under the firing conditions. From about 0.1% to about 2% binder is usually adequate.

The fluxing agent is calculated on the basis of the metal oxide that it forms in those cases where a metal oxide precursor is used. The metal oxide or hydroxide can vary in amount from 0.02 to 20% or more based on the total weight of the aluminum. Preferably from about 0.2 to 5% is used. Higher concentrations of fluxing agent may be employed but are generally avoided, unless the fluxing agent also acts as a filler refractory, to prevent undue lowering of the melting point of the final structure and loss of strength at elevated temperatures.

The required porosity (at least 20% after removal of volatile material) can be achieved in any of several ways well within the skill of the art. For example, it may be controlled by the degree of compaction of the green body, by the introduction of materials which volatilize or burn off at the firing temperature, etc. The molded object is then dried.

The dried "green" molded object is then heated in an oxidizing atmosphere such as air, oxygen or mixtures of oxygen and inert gases at a temperature of at least about 400° C. but below the ignition temperature of the metal at the concentration of oxygen employed. The exact conditions for firing will depend upon the green porosity of the shaped object, the amount of metal, the amount and kind of fluxing agent and the temperature. These interactions and variations among them will be apparent to one skilled in the art. To make the best products, the above-mentioned variables should preferably be selected so that a spontaneous and rapid ignition does not take place, or a spontaneous and rapid reduction of the non-aluminum constituents does not occur. In general at least the first stages of oxidation should be carried out at a relatively low temperature. For example, a temperature of about 650° to 800° C. for a period of about ½ to 48 hours can be used with as little at 0.1 to 3% of an alkali metal oxide or hydroxide. The less active fluxing agent such as MgO in the amount of 0.1 to 10% will require from 1 to 72 hours at temperatures of 1000° to 1350° C. or higher. It is preferred to heat at a relatively low temperature initially, until a stress bearing oxide film develops which holds the molded shape of the aggregate during subsequent further oxidation at a higher temperature.

The oxidation of the aluminum is from 10 to 99% complete in the final catalyst support. Preferably the product contains no more than 10% metallic aluminum. This oxidation may be carried out in 1 firing when making ordered structures such as honeycombs, small pellets or linings on metal. When the catalyst support is to be used in a particulate form, it is preferable to first fire the mixture of aluminum and fluxing agent in the form of thin porous structures (e.g., ¼ to ½ inch thick sheet) to 50 to 90% conversion of the aluminum. The thin structure can then be comminuted to the desired particle size (e.g., 4 to about 20 mesh), and the particles refired to the desired conversion.

The above process can also be used to form strong, adherent refractory coatings on various substrates. Such coatings or linings are especially useful in reactor tubes in general and more specifically in automobile exhaust manifolds and mufflers.

Steel has been given a strong adherent coating of alpha alumina by dipping the steel into molten aluminum, coating the cold aluminum coat with sodium silicate and heating in air to oxidize the aluminum.

An excellent alumina coating has been made by pressing a mixture of aluminum fibers and sodium silicate to the inner surface of a steel pipe followed by firing.

A partially fired liner consisting of 40% aluminum particles and 60% of a binding clay containing sufficient fluxing agent to permit the reaction is placed in a close-fitting steel exhaust manifold. The temperatures produced by the exhaust gases cause the liner to bond firmly with the steel.

Catalytic components can be added to the above linings by impregnation of the fired structures or by incorporation in the original unfired aluminum mixture.

The above process yields a refractory body with a dense continuous integral skeleton containing alumina. The interconnected walls or elements that constitute the skeleton define or enclose cells or pores. The average size of the cells or pores is determined by the size of the metal particles used in the process. These particles are partially or completely converted to the oxide in the form of a shell or wall surrounding the void left by the original metal particle. The wall or shell defines a cell which corresponds in shape and size to the original metal particle. The cells may be empty or contain some unoxidized aluminum. These pores are to be distinguished from pores existing in the refractory body but outside of the skeletal structure which arise from removal of volatiles or which existed in the green body.

The pores within the skeleton (exclusive of micropores, below 0.5 mil) when measured in a plane cut through a body have an average diameter of between about 0.5 and 200 mils. Preferably, the pore size will range between about 2 and 40 mils. These pores have the appearance of closed cells. The walls surrounding the pores of the skeleton have a minimum thickness of about 0.3 mil and are substantially homogeneous for at least this width. By "substantially homogeneous" is meant that the wall is substantially free of occlusions of nonskeletal material or voids greater than about 0.1 mil in diameter for the minimum thickness. In general, the aluminum particles which are oxidized in situ are located a sufficient distance apart to permit wall formation of at least the minimum thickness between the voids formed from the metal. However, where two or more metal particles in the green mix are so close that a 0.3 mil wall cannot form between the voids, the wall referred to above is that surrounding the combination of voids.

The maximum thickness of the wall surrounding a pore within the skeleton will be about the diameter of the enclosed pore. However, the walls of two adjacent pores may integrate to give a double wall thickness between them. The walls may appear thicker in a particular planar section, however, since the structure is three-dimensional, the thickness of a wall can best be determined from a section cut perpendicular to the major axis of the cell.

The crystalline grains in the skeletal wall have a density function of from between about 0.5 and 1.0. Structures of this type are exemplified in the examples.

The continuity of the skeletal structure can be shown by treating the refractory with a chemical that is relatively inert to the skeletal phase but which will dissolve or destroy any other phases. An integral structure of substantially all the skeletal material remains. A more simple procedure is to observe the skeletal and other material in enlarged photographs of cuts through the body. To obtain a true representation of the structure, the sections selected for examination should be of cuts made well within the body, e.g., at a depth of at least about 20% of any external dimension of the body. In general, the skeletal structure is obvious from the fact that the dense continuum referred to above extends throughout the section observed and constitutes at least about 19% of the area of the solid material of the section. However, in the instance where amounts of aluminum around the lower limit are employed, the dense skeletal structure may appear slightly discontinuous in a planar section. In this event, establishment of skeletal structure continuity involves the examination of successive parallel sections obtained by cutting or polishing the body.

The chemical constitution of the skeleton can be determined by conventional analysis or quantitative X-ray diffraction methods.

Most catalyst supports of this invention including the ordered structures will have the continuous integral skeleton characterized by cell-defining walls. When the final catalyst support is made by breaking or grinding a larger structure, it will be obvious that in some cases when using aluminum particles that are about the same size or larger than the catalyst support particles only fragments of a skeleton can be observed in any one particle. Preferably the aluminum particles used will have at least one dimension less than 125 mils.

In determining the "perfection factor" referred to above, an X-ray diffraction pattern is obtained on a sample of the candidate compound (passes 200 mesh) using a recording diffractometer (Philips Electronics Instruments, Catalogue No. 42272/1 and No. 12206/50). A scanning speed of $2\theta = \frac{1}{8}°$ per minute, a time constant of 8, and a chart speed of one inch per minute is used while the recorder is set for a full scale deflection of 100 counts per second.

A straight line is drawn on the plot of intensity vs. $2\theta$ from the intensity of value at $2\theta = 94.00°$ to the intensity value of $2\theta = 96.50°$ to give a base line. The altitude to the maximum peak intensity is constructed perpendicular to the base line and measured. A line is drawn parallel to the base line that bisects the altitude. The length of this line between the intensity values of the plot gives the breadth of the diffraction peak at half maximum intensity E.

A portion of the original sample is refired in oxygen at 1425° C. for 3 hours. This changes the characteristic black or dark gray color of the catalyst support to white or a very light color. The breadth of the diffraction peak at half maximum intensity for the refired sample G is determined as above. The perfection factor $F = E/G$. Preferred catalyst supports of this invention have a perfection factor that is at least 1.5 and may be as high as 3 or 4.

The refired sample gives 2 partially resolved plots above the base line ($CuK_{\alpha 1}$ and $CuK_{\alpha 2}$) and this method compares the breadth of the larger peak ($CuK_{\alpha 1}$) to the broadened combined (not resolved) peak of the original sample.

A measure of the density of the skeletal structure is the "density function."

Density function $$= \text{average} \left[ \frac{\text{part of perimeter in contact with other grains}}{\text{total perimeter of grain under consideration}} \right]$$

The density function is determined for each grain by examining a photomicrograph of a polished section of the sample and the results are averaged. Most products of this invention, as made, show no visible grain boundaries after etching and viewing at 750× magnification. In this event the value of the density function approaches an upper limit of 1.0. Grain growth can occur with prolonged heating at, for example, 100 hours at 1600° C. to afford an average grain size of about 8 microns. Further grain growth is limited by the thickness of the skeleton and the value of the density function approaches the lower limit of 0.5.

Cell (or pore) size is determined by the lineal analysis of microstructure technique as discussed by W. D. Kingery in "Introduction to Ceramics," pages 412–417 (published by John Wiley & Sons, Inc., New York, 1960). The individual cells of products of this invention may have diameters varying from 1 to 5000 microns depending upon the shape of the aluminum used in the process and the compaction of the green body. However, the larger cells with a diameter of from 50 to 5000 microns form the substantial portion of the total porosity.

The catalytically active metal component is deposited on and in the catalyst support by any of the methods well known in the art. Thus platinum may be deposited by impregnation of the catalyst base with a solution, preferably an aqueous solution, of tetramineplatinous chloride. Chromium oxide or molybdenum oxide may be deposited by impregnation of the catalyst base with a solution, preferably an aqueous solution of respectively, chromium nitrate or ammonium molybdenate, followed by heating to form the oxide. Usually the impregnated catalyst base is roasted at a temperature in the range 350–800° C., the precise temperature being determined according to the nature of the metallic element in the catalyst so deposited.

Nickel, cobalt or iron can be deposited upon the catalyst base by impregnating with a solution of a Group VIII compound (e.g., nitrates, formates or acetates) which is decomposable, under the action of heat, to an oxide of nickel, cobalt or iron and thereafter roasting the impregnated catalyst support.

The manganese and zinc chromite catalysts of Wortz U.S. Patent 2,108,156, granted Feb. 15, 1938, are especially useful in the oxidation of automotive exhaust fumes.

For some applications a catalytic metal component can be included within the structure of the alumina base by incorporating it in the green firing mixture. Thus, chromium oxide, nickel oxide, tungsten trioxide, sodium molybdate, etc., can be included as part of the filler refractory or as the flux itself when the aluminum-containing masses are fired. Since much of the catalytic component is included within the skeleton structure of the base, this method is less preferred than the after treatment of the prefired catalyst support.

The catalyst support can also contain minor amounts of promoting or stabilizing constituents as for instance silica, titania, zirconia, thoria, etc.

The catalytic structures of this invention are useful for automotive exhaust abatement as well as for many other oxidation reduction reactions.

FIGURE 1 is a schematic representation of an oxidation reactor that can be used for treatment of exhaust gases. In the drawing, a catalyst-impregnated honeycomb structure 2 is located within the enlarged portion of stainless steel reactor shell 1 in sections $a$ through $e$. Opening 3 of the shell receives the gases to be oxidized and in the case of automobile exhaust gases would be attached to the exhaust ports of the cylinders. Opening 4 provides means for diluting the exhaust gases with air, while opening 5 provides an exit for the gases from the system.

Figure 2:
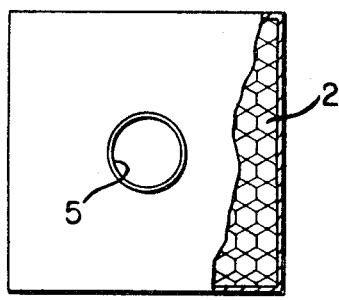

FIGURE 2 is a schematic representation in cross section of the honeycomb structure 2.

EXAMPLE I

Several catalyst supports are prepared as follows:

(1) Aluminum fibers (99.995% Al) of 0.004 inch diameter are loosely pressed into a 3-inch x 6-inch mold and flooded with a sodium silicate solution (40° Bé.). The batt of fibers is pressed in the mold at 100–300 pounds per square inch (p.s.i.) pressure and the excess sodium silicate removed. The wet brick is dried overnight at 180° C. under vacuum. The dry brick is heated in an air atmosphere according to the following schedule:

to 600° C. in 20 hours
at 600° C. for 15 hours
at 650° C. for 5 hours
at 700° C. for 5 hours
at 850° C. for 15 hours The gain in weight of the brick indicates that about 64% of the aluminum has been converted to alumina. The fired brick is crushed with a hammer and the particles sieved through a 4-mesh to 8-mesh screen. The screened particles are fired at 900° C. in air for 12 hours.

The refired particles are dark gray in color, have a low apparent density and are quite resistant to crushing. Examination under a low power microscope shows a skeletal structure of a fused-appearing dark gray substance surrounding open pores. Occasional sections are white or light gray in color. X-ray analysis of the product shows it to be substantially alpha alumina with some silicon metal. The product (support No. 1) has a perfection factor of 2.1.

(2) The above procedure is repeated using annealed lathe turnings of an aluminum alloy (copper 3.91%, manganese 1.50% and nickel 1.97% as chief impurities) to yield a similar product for support No. 2.

(3) The procedure for item 1 is repeated using annealed lathe turnings of an aluminum alloy containing 10% magnesium to give support No. 3.

(4) Commercial alpha-alumina (99.49% pure), in the form of 1/8" x 1/8" right cylinders having an apparent density of 2.2 is used as support No. 4 as a comparison for supports 1 to 3.

All four supports have a similar surface area of <1 square meter per gram as measured by B.E.T. method [1].

The particulate catalyst supports are immersed in an aqueous solution containing one mole manganese nitrate and one mole chromium trioxide ($CrO_3$) per liter for 10 minutes. The particles are removed from the solution and placed wet in a glass tube. Anhydrous ammonia vapor is passed through the particles and this is continued for 5 minutes after ammonia appears in the exhaust stream. The particles are removed from the tube and heated at 400° C. for 2 hours. The above impregnation process is repeated.

In evaluating the novel catalyst structure a reactor is employed consisting of a 1-inch I.D. stainless steel pipe in a vertical position having a sealed removable cap at the top and a horizontal outlet near the top. The lower end of the tube contains a screen located above a baffle plate connected to a 0.25" I.D. stainless steel tube in the form of a coil as a preheater. A small tube containing thermocouples at fixed distances apart is located in the center of the reactor tube above the lower screen. The pipe is covered with magnesia insulation containing electrical heating elements.

The reactor is charged with 4–8 mesh classified catalyst to a depth of 8.5 inches and a screen placed on top. The catalyst and tube is heated to 450° C. The gas to be tested is heated to 450° C. and passed through the reactor at a rate of 25 liters/minute. The temperature rise in the catalyst bed is observed. An activity index for each gas is calculated as follows:

$$\text{Activity index} = \frac{K}{d} \times 100$$

where K has values of 1.42, 1.26, and 2.64 for CO, $C_2H_4$ and $C_2H_6$ respectively, and $d$ is the distance in inches of catalyst bed through which gas flows before a bed temperature rise of 22° C. (for CO) or 19 C. (for $C_2H_4$ or $C_2H_6$) occurs. This distance may be obtained by interpolation between thermocouples. Determinations are reproducible to ±5%.

The gases used are diluted with 1200 volumes of air and 25,000 volumes of nitrogen per 150 volumes of carbon monoxide or 9.5 volumes of ethylene or ethane.

---
[1] See Advances in Catalysis, volume I, pages 65–89, Academic Press, New York, N.Y., 1948.

These gases are representative of combustible constituents in automotive exhaust gases.

TABLE 1

| Catalyst Support | | | Activity Index for Oxidation of— | | |
|---|---|---|---|---|---|
| Item | No. | Impregnated | CO | $C_2H_4$ | $C_2H_6$ |
| a | 4 | No | 5–10 | 5–10 | 5–10 |
| b | 1 | No | 20 | 15 | 18 |
| c | 1 | + | >284 | 164 | 172 |
| d | 2 | + | >284 | 158 | 176 |
| e | 3 | + | >284 | 165 | 170 |
| f | 4 | + | 284 | 126 | 138 |
| g | 1 | + | 181 | 74 | 72 |
| h | 2 | + | 164 | 77 | 59 |
| i | 3 | + | 160 | 57 | 59 |
| j | 4 | + | <5 | <5 | <5 |

Results are given in Table 1. The catalyst supports for items a–f were heated at 450° C. for 3 hours prior to the test; those of items g–j were heated at 1000° C. for 3.5 hours before the test.

A comparison of items a and b shows that the nonimpregnated catalyst support of this invention is significantly superior as an oxidation catalyst as compared to commercial alpha alumina (item a). The greater temperature rise per increment of bed height indicates that a greater amount of oxidation has occurred.

A comparison of items c–f shows that the catalyst impregnated support of this invention is superior to the control (item f). This superiority is even more marked in items g, h, and i as compared to item j. This indicates that the catalyst impregnated support of this invention is greatly superior in heat stability to conventional impregnated catalysts.

EXAMPLE II

Five pieces of a 4″ x 4″ x 2″ section of a 2-mil thick aluminum foil honeycomb are oxidized and then impregnated with a manganese chromite catalyst as follows:

The hexagonal open cells are 2″ long and the opposite walls of a cell are about 0.125″ apart. The honeycomb is cleaned with dilute aqueous hydrochloric acid. The clean structure is dipped into a solution containing equal weights of 40° Bé. sodium silicate, 1% aqueous sodium alginate and aluminum powder (−325 mesh). The excess of the coating is blown from the honeycomb by means of high-pressure air. The coating is dried at 100° C. for 16 hours.

The dry coated structure is fired in an air atmosphere at 600° C. for 16 hours, at 720° C. for 7 hours, from 720° C. to 1200° C. in 3 hours and then heated at 1200° C. and held there for 12 hours. The product has a dark gray color and has a perfection factor of 2.7.

The fired honeycomb is impregnated with a manganese chromite catalyst using the procedure of Example I. The catalyst-impregnated honeycombs are placed in a reactor as shown in FIGURE 1. The stainless steel shell is attached by opening 3 to the exhaust port of a single cylinder of an automobile engine. Opening 4 is used to introduce auxiliary air into the exhaust as desired. Thermocouples located in the shell immediately prior to honeycomb sections a and e respectively are used to follow the reaction. In addition the exit gas from the exit 5 is analyzed by a flame ionization hydrocarbon analyzer.

The following results are obtained where items b and d show the improvement over items a and c respectively. When the reactor is replaced by a simple steel tube the addition of 10% auxiliary air only reduces the hydrocarbon content of the exit gases by about 5 to 7%.

| Item | a | b | c | d |
|---|---|---|---|---|
| Engine condition (miles/hour) | 30 | 30 | 50 | 50 |
| Auxiliary air, wt. percent | 0 | 10 | 0 | 10 |
| Hydrocarbon concentration (parts per million) | 790 | 465 | 560 | 325 |
| Percent reduction in hydrocarbon | | 35 | | 36 |
| Exhaust gas temperature (° C.): | | | | |
|   Entrance to reactor (4) | 660 | 665 | 810 | 810 |
|   In reactor (point 3) | 671 | 793 | 826 | 865 |

The motor is operated under varying conditions for about 27 hours and results equivalent to above obtained. The reactor unit is dismantled. The honeycomb sections are found to have suffered no apparent physical deterioration.

EXAMPLE III

This example shows the incorporation of a catalyst in the formation of the catalyst support.

Various mixtures of aluminum metal and a fluxing agent are made, fired, ground to 4 to 8 mesh, impregnated as in Example I and calcined at 400° C. The activity index is determined as in Example I. The preparative conditions used and results obtained are given in Table 2.

Aluminum wool is used for items a, b, and c while aluminum cylinders .08″ in diameter x 0.125″ long are used for item d.

TABLE 2

| Item | Fluxing agent | | Fired to ° C. | Conversion, percent | Activity index for oxidation of— | | |
|---|---|---|---|---|---|---|---|
| | Compound | Percent of Total | | | CO | $C_2H_4$ | $C_2H_6$ |
| a | $Cr_2O_3$ | 15 | 1,000 | 50 | >284 | 208 | 202 |
| b | $Ni_2O_3$ | 41 | 1,000 | 40 | >284 | 174 | 149 |
| c | $WO_3$ | 14 | 850 | 60 | >284 | 252 | 343 |
| d | $Na_2MoO_4$ | 15 | 850 | | >284 | 72 | 70 |

EXAMPLE IV

A block of the aluminum honeycomb structure of Example II is oxidized as in that example. The fired structure (250 parts), is immersed in a solution comprising 5 parts by weight of platinum as chloroplatinic acid dissolved in 500 parts by weight water at 50° C. After immersion for a period of 15 minutes, the block is removed and is reduced by exposure in a suitable vessel to hydrogen humidified with water to 60% at 75° C. The block is also at 75° C. and the humidified hydrogen reduces the platinum to metal under these conditions. The platinum impregnated alumina structure in a less than 100% oxidation of the aluminum is then suitable for use in catalytic reaction.

A major application for the catalyst is in automotive exhaust, however, it also can be used in combustion operations in general and is particularly useful in those operations in which hydrocarbons are partially oxidized for the production of chemical synthesis gases such as carbon monoxide, hydrogen, and carbon dioxide.

EXAMPLE V

The procedure of Example IV is used except that instead of 5 parts per weight of platinum there is used 2½ parts per weight of platinum as chloroplatinic acid and 2½ parts by weight of palladium as palladium chloride.

This catalyst is useful for the oxidation of fumes from internal combustion engines and also for catalytic oxidations in general, and particularly those at extremely high temperatures such as for the partial combustion of hydrocarbons for the preparation of synthesis gases for chemicals manufacture.

EXAMPLE VI

One volume of aluminum particles (10/20 mesh grain ingot) coated with 1.0 NaOH and 10 volumes of alumina particles smaller than 100 mesh are thoroughly mixed and poured into an alumina crucible. The crucible and its loose contents is heated in air following the firing schedule of Example II.

The crucible and its contents are cooled and the cold reaction mixture is screened through a 100-mesh screen to remove the alumina powder. The particles retained by the screen have the approximate shape of a sphere with a hollow interior corresponding in size to the original metal particle. The sphere is composed of alpha alumina, is colored black and contains from 2 to 5% of metallic aluminum finely dispersed in the dense wall. The spheres are crushed into particles that pass through a 200-mesh screen.

Forty parts by weight of the above pulverized alumina is slurried in a solution comprising 1000 parts by weight of water at 45° C. in which is dissolved 100 parts by weight of chromic acid anhydride ($CrO_3$) and 29 parts by weight of nickel as the nitrate. A concentrated solution of ammonium carbonate is slowly added to the solution slurry to effect complete precipitation as determined by a test of the supernatant liquid. The precipitate is filtered and then calcined at 400° C. for 1 hour.

The calcined powder obtained above is kneaded with water, 100 parts by weight of the powder and approximately 50 parts by weight of water, to form a uniform paste. More or less water is added to produce a paste of the desired putty-like consistency. The paste is dried at 150° C. for 12 hours.

The dried paste is pulverized so that 100% passes through a 10-mesh screen. It is then mixed with 1% graphite and formed into 1/8" x 1/8" right cylinders in a pilling machine. The pills are finally heat treated at 500° C. for 3 hours in air.

The pills so formed are useful in combustion operations such as the removal of combustibles and nitrogen oxide from the exhaust of internal combustion engines and is also useful in oxidations such as the synthesis of formaldehyde my partial oxidation of methane.

EXAMPLE VII

Aluminum foil particles (5 mils x 10 mils x 190 mils) are soaked in a 1% alcoholic solution of sodium hydroxide, drained and dried. The coated foil is mixed with a 2% aqueous solution of sodium carboxymethyl cellulose molded to a bar and dried. The dried bar is fired, ground and refired as in Example I.

The 4–8 mesh alumina granules (250 parts) containing at least 1% of incompletely oxidized aluminum is immersed for 10 minutes in a solution slurry composed of 117 parts by weight of ammonium meta-vanadate, 25 parts by weight titanium dioxide and 32 parts by weight of copper as copper nitrate in 500 parts by weight of water at 90° C. The impregnated granules are drained, and then calcined at 300° C. for 10 minutes.

The resultant copper vanadate with titanium dioxide interspersant supported on the alumina structure is a useful catalyst for oxidations in general, but particularly for the conversion of sulfur dioxide to sulfur trioxide and also for the oxidation of combustibles in the exhaust from internal combustion engines.

EXAMPLE VIII

Two hundred fifty parts by weight of support No. 1 of Example I, in which the aluminum is only partially oxidized to the trivalent state, is immersed for 15 minutes in a solution composed of 30 parts by weight of cobalt, 27.5 parts by weight of manganese and 4 parts by weight of magnesium oxide, all as the nitrates, in 500 parts by weight of water at 90° C. The impregnated particles are drained, then are calcined at 500° C. for one hour thus forming cobalt-manganate.

The catalyst so prepared is useful for oxidizing ethylene to ethylene oxide, $SO_2$ to $SO_3$, naphthalene to phthalic anhydride, methanol to formaldehyde and especially for the oxidation of the combustible constituents in the exhaust from internal combustion engines. The catalyst is also especially useful in high temperature reactions such as those occurring when hydrocarbons are partially oxidized to synthesis gases comprising hydrogen, carbon dioxide and carbon monoxide.

What is claimed is:

1. A supported catalyst consisting essentially of at least 0.01% by weight of a catalytically active metal component deposited on a porous refractory body, said catalytically active metal component being selected from the group consisting of (1) oxides and mixed oxides of iron, cobalt, nickel, vanadium, chromium, manganese, copper, zinc, molybdenum, silver, tin, barium, cerium, tungsten, lead and bismuth; (2) elemental ruthenium, platinum, palladium, rhodium, osmium and iridium; and (3) mixtures thereof, said porous refractory body comprising a skeletal structure of dense, crystalline cell-defining walls, said cells having an average diameter between 0.5 and 200 mils, the walls defining said cells having a thickness of between 0.3 and 200 mils, the wall material being selected from the group consisting of alpha alumina, compounds and solid solutions of alumina and at least one other metal oxide, and solid solutions of at least one metal oxide in said compounds of alumina, provided that said wall material contain at least 30% by weight $Al_2O_3$ and at least 1% aluminum in a state of oxidation below a valence of 3.

2. The supported catalyst of claim 1 wherein the porous refractory body is at least 80% $Al_2O_3$.

3. The supported catalyst of claim 1 wherein the porous refractory body is crushed to provide a particulate catalyst base.

4. A catalytic structure consisting essentially of at least 0.01% by weight of a catalytically active metal component deposited on a refractory honeycomb structure, said catalytically active metal component being selected from the group consisting of (1) oxides and mixed oxides of iron, cobalt, nickel, vanadium, chromium, manganese, copper, zinc, molybdenum, silver, tin, barium, cerium, tungsten, lead and bismuth; (2) elemental ruthenium, platinum, palladium, rhodium, osmium and iridium; and (3) mixtures thereof, said honeycomb structure having walls having a thickness between 0.3 and 200 mils, the wall material being selected from the group consisting of alpha alumina, compounds and solid solutions of alumina and at least one other metal oxide, the solid solutions of at least one metal oxide in said compounds of alumina, provided that said wall material contain at least 30% by weight $Al_2O_3$ and at least 1% aluminum in a state of oxidation below a valence of 3.

5. The catalytic structure of claim 4 wherein the honeycomb structure is at least 80% $Al_2O_3$.

6. The method of claim 5 comprising the additional step of crushing the molded body after firing but before depositing the catalytically active metal component thereon to provide a particulate support material.

7. A method for making supported catalysts which comprises firing a molded body, at a temperature within the range of 650° and 1500° C. and in the presence of oxygen, said molded body comprising aluminum particles having one dimension of at least 7 mils, a second dimension of at least about 0.5 mil and a third dimension of between 0.5 and 200 mils, and between 0.02% and 20% by weight of the aluminum of a metal oxide fluxing agent selected from the group consisting of the oxides of the alkali metals, the alkaline earth metals, vanadium, chromium, molybdenum, tungsten, copper, silver, zinc, antimony and bismuth, precursors of said oxides yielding the indicated amount of said oxide under the firing conditions, and hydroxides of the alkali metals until at least 10% of the aluminum has been oxidized and at least 1% is present in a state of oxidation below a valence of 3, and depositing a catalytically active metal component selected from the group consisting of (1) oxides and mixed oxides of iron, cobalt, nickel, vanadium, chromium, manganese, copper, zinc, molybdenum, silver, tin, barium, cerium, tungsten, lead and bismuth; (2) elemental ruthenium, platinum, palladium, rhodium, osmium and iridium; and (3) mixtures thereof.

8. The method of claim 7 wherein the aluminum particles are an aluminum foil honeycomb structure.

9. The method of claim 7 wherein the firing is continued until at least 90% of the aluminum has been oxidized.

10. The method of claim 7 wherein the fluxing agent is sodium oxide applied as sodium silicate.

References Cited

UNITED STATES PATENTS

| | | | |
|---|---|---|---|
| 2,071,119 | 2/1937 | Harger | 23—2.2 |
| 2,249,613 | 7/1941 | Kinneberg | 252—455 X |
| 2,261,517 | 11/1941 | Greger | 252—477 X |
| 2,504,497 | 4/1950 | Charles et al. | 252—463 |
| 2,517,223 | 8/1950 | Mantell | 252—476 X |
| 2,580,806 | 1/1952 | Malina | 252—463 |
| 2,730,434 | 1/1956 | Houdry. | |
| 2,840,619 | 6/1958 | Mason et al. | 252—466 X |
| 2,889,288 | 6/1959 | Houdry et al. | 252—463 |
| 2,942,932 | 6/1960 | Elliott | 23—2 |
| 2,965,583 | 12/1960 | Houdry et al. | 252—463 X |
| 3,053,612 | 9/1962 | deRosset | 23—2.2 |
| 3,086,839 | 4/1963 | Bloch | 23—2 |
| 3,088,271 | 5/1963 | Smith | 23—2.2 X |
| 3,155,627 | 11/1964 | Cole et al. | 252—477 |
| 3,167,499 | 1/1965 | Haresnape et al. | 252—477 X |
| 3,177,229 | 4/1965 | Leak et al. | 252—477 X |
| 3,216,954 | 11/1965 | Howk et al. | 252—465 |
| 3,255,027 | 7/1966 | Talsma | 106—65 |

FOREIGN PATENTS 418,790  10/1934  Great Britain.

MILTON WEISSMAN, *Primary Examiner.*

G. L. OZAKI, *Assistant Examiner.*